US010834663B2

(12) United States Patent
Jia et al.

(10) Patent No.: US 10,834,663 B2
(45) Date of Patent: Nov. 10, 2020

(54) BLIND MULTI-FREQUENCY BAND INDICATOR SELECTION

(71) Applicant: AT&T Mobility II LLC, Atlanta, GA (US)

(72) Inventors: Yupeng Jia, Austin, TX (US); Inderpreet Singh Ahluwalia, Austin, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 92 days.

(21) Appl. No.: 15/287,691

(22) Filed: Oct. 6, 2016

(65) Prior Publication Data

US 2018/0103415 A1   Apr. 12, 2018

(51) Int. Cl.
*H04W 48/10* (2009.01)
*H04W 48/16* (2009.01)
*H04W 8/22* (2009.01)

(52) U.S. Cl.
CPC ........... *H04W 48/10* (2013.01); *H04W 48/16* (2013.01); *H04W 8/22* (2013.01)

(58) Field of Classification Search
CPC ... H04W 48/10; H04W 48/16; H04W 72/042; H04W 72/0453; H04W 8/22; H04W 48/18; H04W 88/06; H04L 5/003
See application file for complete search history.

(56) References Cited

U.S. PATENT DOCUMENTS 8,583,120 B2   11/2013   Gong et al.
8,594,074 B2   11/2013   Olsson et al.
(Continued)

FOREIGN PATENT DOCUMENTS

| EP | 2705697 A1 | 3/2014 |
|---|---|---|
| WO | 2015066476 A1 | 5/2015 |
| WO | 2015107102 A1 | 7/2015 |

OTHER PUBLICATIONS

Hwang, Woonhee, "LS on KeNB generation in case of MFBI," 3GPP TSG RAN WG2 Meeting #82, 3gpp.org, May 20-24, 2013, Fukuoka, Japan. [http://www.3gpp.org/ftp/tsg_ran/WG3_lu/TSGR3_80/docs/R3-131126.zip], retrieved Jul. 15, 2016, 2 pages.

(Continued)

*Primary Examiner* — Kan Yuen
(74) *Attorney, Agent, or Firm* — Amin, Turocy & Watson, LLP (57) ABSTRACT

Blind selection of a multi-frequency band indicator (MFBI) channel is disclosed. The crowded wireless spectrum can comprise overlapping bands, e.g., LTE bands 17 and 12. Whereas current standards allow setting the E-UTRA frequency to only one absolute radio-frequency channel number, alternative channel information can be distributed via SIB message. However, where a UE cannot read the MFBI information in a SIB message, the UE can be ignorant of a channel in an alternative band. Channel information for an alternative band can be sent to the UE as part of a radio resource control RRC message, for example, comprising a dEUTRACarrierFreqInfo value. The RRC connection release message can cause the UE to release a connection and then reestablish a new connection based on the channel information for then alternative band. This can allow mobile devices that do not support MFBI via SIB, to access channels in MFBI-type bands.

20 Claims, 9 Drawing Sheets

(56) References Cited

U.S. PATENT DOCUMENTS

| | | | |
|---|---|---|---|
| 8,694,003 | B2 | 4/2014 | Huang et al. |
| 8,737,355 | B2 | 5/2014 | Kumpala et al. |
| 8,804,586 | B2 | 8/2014 | Fong et al. |
| 8,923,870 | B2 | 12/2014 | Kubota et al. |
| 9,078,261 | B2 | 7/2015 | Takahashi et al. |
| 9,088,926 | B2 | 7/2015 | Liu et al. |
| 9,237,483 | B2 | 1/2016 | Oprescu-Surcobe et al. |
| 9,307,475 | B2 | 4/2016 | Takahashi et al. |
| 9,374,701 | B2 | 6/2016 | Persson et al. |
| 9,392,447 | B2 | 7/2016 | Hwang et al. |
| 9,392,610 | B2 | 7/2016 | Jung et al. |
| 2013/0053103 | A1* | 2/2013 | Kim ........................ H04L 5/003 455/561 |
| 2013/0083773 | A1 | 4/2013 | Watfa et al. |
| 2013/0242774 | A1 | 9/2013 | Wang et al. |
| 2014/0302821 | A1* | 10/2014 | Hwang ............. H04W 36/0055 455/411 |
| 2014/0307836 | A1* | 10/2014 | Khlat .................... H04L 5/1461 375/343 |
| 2015/0109918 | A1 | 4/2015 | Sharma et al. |
| 2015/0180514 | A1* | 6/2015 | Pavacic ................ H04B 1/0064 455/552.1 |
| 2015/0327139 | A1 | 11/2015 | Sirotkin et al. |
| 2016/0021520 | A1* | 1/2016 | Gudu Gantla .......... H04W 4/90 455/404.1 |
| 2016/0050597 | A1* | 2/2016 | Vamanan ............... H04W 48/16 455/436 |
| 2016/0057671 | A1 | 2/2016 | Yang et al. |
| 2016/0073310 | A1* | 3/2016 | Hapsari ................. H04W 76/18 455/437 |
| 2018/0084549 | A1* | 3/2018 | Liu ...................... H04W 72/048 |

OTHER PUBLICATIONS

"Handovers," Keysight, keysight.com, Jun. 1, 2010. [http://rfmw.em.keysight.com/rfcomms/refdocs/tdscdma/Handovers.htm] retrieved Jul. 13, 2016 8 pages.

Pasupuleti, Kumar Swamy, "RRC Connection Release," How LTE Stuff Works?, [http://howltestuffworks.blogspot.com], Nov. 5, 2011. [http://howltestuffworks.blogspot.com/2011/11/rrc-connection-release.html], retrieved Jul. 15, 2016, 2 pages.

\* cited by examiner

ESTABLISH UTRAN SESSION 730

RRC CONNECTION RELEASE WITH MFBI BAND Y CHANNEL DATA 732

RRC CONNECTION REQUEST FOR MFBI BAND Y CHANNEL 736

RRC RELEASE COMPLETE 734

BLIND MULTI-FREQUENCY BAND INDICATOR SELECTION

TECHNICAL FIELD

The disclosed subject matter relates to enabling a user equipment (UE) to select a channel. More specifically, this disclosure relates to informing a UE to enable the UE to select a channel in a first band when the first band at least partially overlaps a second band comprising another channel at the same frequency.

BACKGROUND

By way of brief background, the continued growth of wirelessly connected devices has created an increasingly crowded radio frequency (RF) spectrum. Delegation of frequency bands to service mobile devices traditionally resulted in blocks of spectrum that did not overlap and allowed wireless carriers to designate channels within bands relatively freely. However, as the spectrum has become increasingly taxed, more sophisticated allocation of unused or less used bands has resulted in overlapping bands that share the same frequencies, e.g., E-UTRA band 17 and 12 overlap, E-UTRA band 38 and 41 have overlap, etc. Current wireless standards, e.g., 3GPP 36.331, etc., states that only one EARFCN can be designated under the E-UTRA frequency parameter. As such, where multiple EARFCNs can exist, e.g., in different bands at the same frequency, the conventional solution has been to indicate, via an information element (IE) in a system information block (SIB), e.g., SIB19, etc., the presence of other MFBI EARFCNs. Where a user Equipment (UE) can read MFBI IEs in a SIB message, this can provide the UE with the ability to select the EARFCN based on determined parameters, e.g., performance characteristics, etc. However, where a UE is unable to read the MFBI IE in a SIB, such as where a chipset of the UE does not support the MFBI protocol, then the UE can remain ignorant of an EARFCN that can be available to the UE, which can result in the UE being unable to perform cell reselection to LTE.

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The radio frequency (RF) spectrum has become increasingly crowded, resulting in overlapping bands that can share a frequency. As examples, E-UTRA band 17 comprises 704-716 MHz and E-UTRA band 12 comprises 699-716 MHz for the uplink frequencies, illustrating overlap in the 704-716 MHz region. Similarly, for example, E-UTRA band 38, at 2570-2620 MHz, and E-UTRA 41, at 2496-2690 MHz, overlap from 2570-2620 MHz. Numerous other examples in both frequency division duplex (FDD) and time division duplex (TDD) channels, for E-UTRA bands are well known. Moreover, the instant disclosure can similarly be applied to overlapping UTRA bands, e.g., UTRA Band 1, Band 4, and Band 10.

Current wireless standards typically state that only one evolved universal mobile telecommunications system (UMTS) terrestrial radio access (E-UTRA) absolute radio-frequency channel number (EARFCN) can be designated under a E-UTRA frequency parameter. As such, where multiple EARFCNs can exist, e.g., in different bands at the same frequency, the conventional solution has been to indicate, via an IE in a SIB, the presence of other multi-frequency band indicator (MFBI) EARFCNs, e.g., freqBandIndicator under the noncriticalExtension portion of SIB1, etc. Increasingly, modern UEs support MFBI IEs via system information block (SIB) messages to allow the UE to select the EARFCN from one of the bands supported by the UE. Similarly, for UTRA, only one UMTS terrestrial radio access (UTRA) absolute radio-frequency channel number (UARFCN) can be designated under a UTRA frequency parameter.

However, for example, in legacy UEs, the UE can have a chipset that does not enable reading an MFBI IE from a SIB message. This can leave the legacy UE unaware of a channel that the UE may be able to employ. As an example, where a UE supports LTE band 12, which shares frequencies with LTE band 17, but the UE does not support MFBI IEs via SIB, and where a wireless carrier indicates channels in band 17 and also indicates channels in MFBI LTE band 12, the UE, due to the inability to read the MFBI LTE band 12, and not supporting LTE band 17, can fail to camp on the LTE band 12 because the UE is simply unaware that channels in that band are available even though, were it aware of the channels, the UE would be readily able to camp on them. Current wireless standards, e.g., e.g., 3GPP TS25.331 (for UTRAN) and 36.331 (for EUTRAN), etc., apply restriction to designating only one EARFCN/UARFCN can result in a UE that does not support MFBI IEs remaining ignorant of useable frequencies of other bands.

To better support devices, e.g., legacy UEs, low cost UEs, etc., the instant disclosure presents a solution to communicate channels to a UE that can allow the UE to connect to more than one EARFCN. In an aspect, in response to an indication that the UE is not selecting an available LTE channel, an radio resource control (RRC) connection release procedure can be imitated, wherein the RRC connection release message comprises other available channel numbers. As such, where a UE supports LTE band Y but cannot read a SIB message indicating LTE MFBI band Y, e.g., where the RAN device indicates both EARFCN in LTE band X and LTE MFBI band Y, the UE can fail to select a channel in LTE band Y because it is unaware of the channel due to an inability to read the MFBI IEs. This failure to select LTE band Y can be an indication of the UE being unable to read MFBI IEs in a SIB. This can cause a RRC Connection Release procedure to be initiated, for example, upon an expiration of an inactivity timer on a Node B, the RRC Connection Release procedure can be initiated. However, unlike conventional RRC Connection Release messages, the presently disclosed RRC Connection Release message can comprise other available channels to be indicated in the redirection information portion of the RRC Connection Release message. The UE can then release the connection and reconnect in accord with an EARFCN indicated in the presently disclosed RRC Connection Release message. Conveniently, modification of a conventional RRC Connection Release message to include other available channel information can be performed with much less expense and far less complexity that adapting legacy UEs to support MFBI IEs sent in SIB messages. The reselection of an alternate channel occurs after a connection release, e.g., during initiation of a new connection, and thus can be termed a 'blind reselection' of the channel.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

Figure 1:
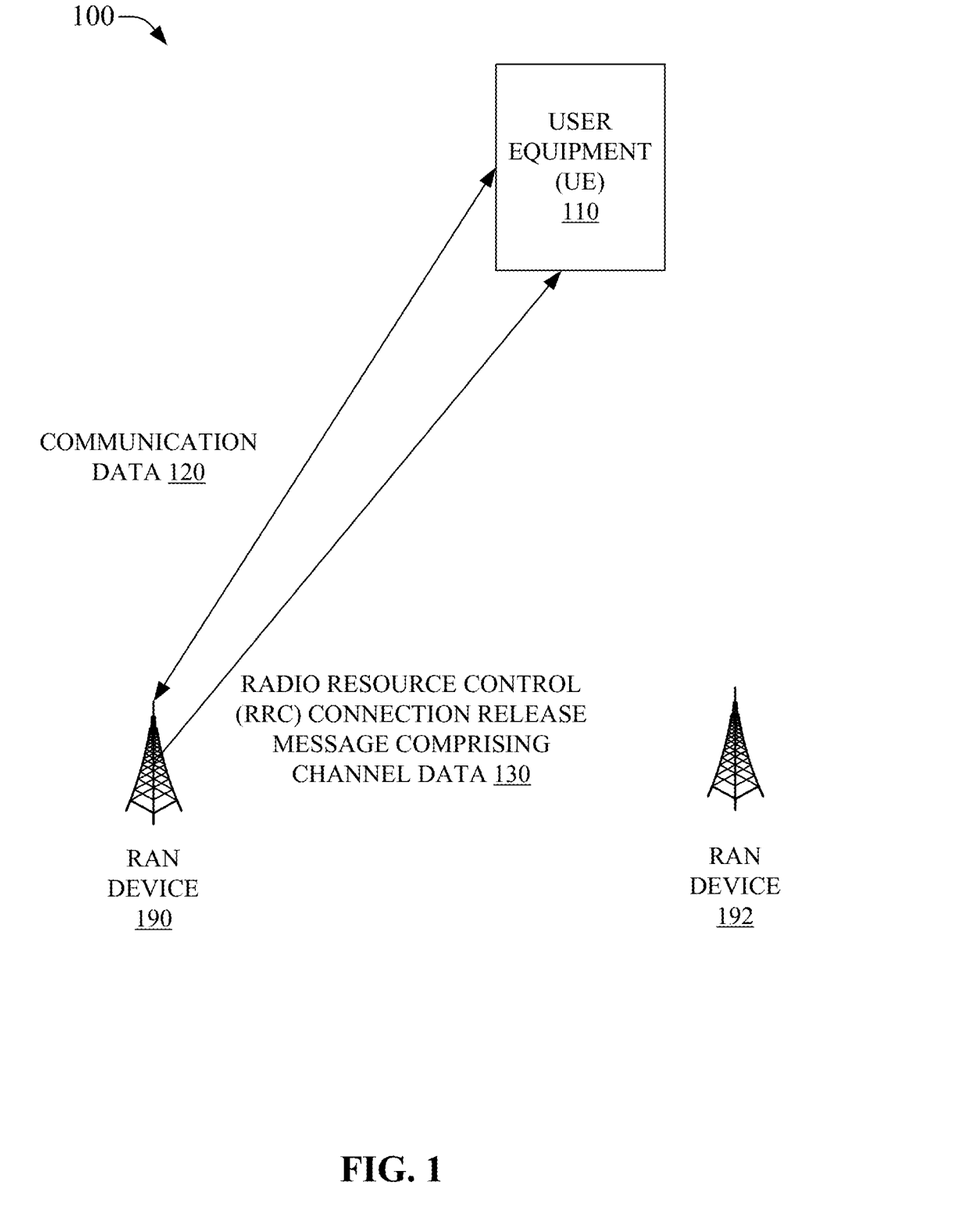
FIG. 1 is an illustration of an example system that can enable channel selection for LTE MFBI via a radio resource control message in accordance with aspects of the subject disclosure.

FIG. 1 is an illustration of a system 100, which can enable channel selection for LTE MFBI via an RRC message in accordance with aspects of the subject disclosure. System 100 can comprise user equipment (UE) 110. UE 110 can be a mobile device such as a cellular phone, smartphone, tablet computer, etc. UE 110 can be communicatively coupled to radio access network (RAN) device 190. RAN 190 can comprise or be coupled to a NodeB, eNodeB, or a radio or transmitter/receiver, etc., of a NodeB/eNodeB, a base station, access point (AP), femtocell, picocell, etc. UE 110 can send and/or receive communication data 120 via a wireless link to RAN device 190.

In system 100, a radio resource control (RRC) message can be sent from RAN device 190. In an embodiment, UE 110 can receive a RRC message. The RRC message can be a RRC connection release message. In an embodiment, the RRC message can be a RRC connection release message comprising channel data 130.

The channel data of RRC connection release message comprising channel data 130 can comprise a channel number indicating a channel on a band. In an embodiment, the band can at least partially overlap another band. As an example, the band can be LTE band 17 and the other band can be LTE band 12, etc., which can, for example, overlap in the 700 MHz block B and block C portions of the band. In an aspect, the channel number can indicate an MFBI channel. As such, RAN device 190, for example, can indicate EARFCN as a channel in a first band and can indicate an MFBI channel EARFCN in a second band. The MFBI channel EARFCN in the second band can also be communicated by RAN device 190 to UE 110 comprised in RRC connection release message comprising channel data 130.

In an aspect, RAN device 190, for example, can indicate EARFCN as a channel in a first band and can indicate an MFBI channel EARFCN in a second band. Where UE 110 can receive both the EARFCN in the first band and can receive and read the MFBI channel EARFCN in the second band, UE 110 can select which channel to use without further employing the disclosed subject matter. However, where UE 110 can receive both the EARFCN in the first band and can receive the MFBI channel EARFCN in the second band, but is unable to read the MFBI channel EARFCN in the second band, UE 110 can be unaware of the MFBI channel EARFCN in the second band. This can occur where, for example, the UE chipset is not configured and/or designed to interpret, read, understand, etc., MFBI information, such as can be experienced with legacy UEs. As such, where UE 110 is unable to capture, read, decode, etc., MFBI channel EARFCN in the second band, RRC connection release message comprising channel data 130 can be employed to communicate a channel number to UE 110. This can allow UE 110 to release the connection to RAN device 190 and then reestablish a connection to RAN device 190 in accord with the channel data communication to UE 110 via RRC connection release message comprising channel data 130.

In an embodiment, RAN device 190 can send RRC connection release message comprising channel data 130 indicating a channel for another RAN device, such as RAN device 192, etc. In an aspect, this can enable UE 110 to release the connection from RAN device 190 and reestablish a connection to RAN device 192 in accord with a channel number communicated to UE 110 via RRC connection release message comprising channel data 130.

In an aspect, the disclosed subject matter is, in part, intended to allow UEs that are not configured, e.g., via hardware or software, to read MFBI information elements (IEs) in system information blocks (SIBs), to receive and employ a channel number in a second band, e.g., an alternative band, that at least partially overlaps a first band, e.g., a primary band, associated with an EARFCN being designated as the E-UTRA frequency of the first band. As an example, where both LTE band 17 and LTE band 12 share certain frequencies, e.g., in the block B and block C portions of the bands, UE 110 should be able to use a channel of band 12 or of band 17 where the physical frequency is common to both band 12 and band 17. However, because a UE can be unable to interpret MFBI IEs for a channel in an alternate band, the UE can be deprived of an opportunity to employ the channel in the alternate band without the presently disclosed subject matter. As such, the RRC connection release message comprising channel data 130 can at least provide the channel number for the alternate band to this type of UE. In an embodiment, the use of RRC connection release message comprising channel data 130 can enable access to an alternate band channel without need to alter the hardware of the UE.

Figure 2:
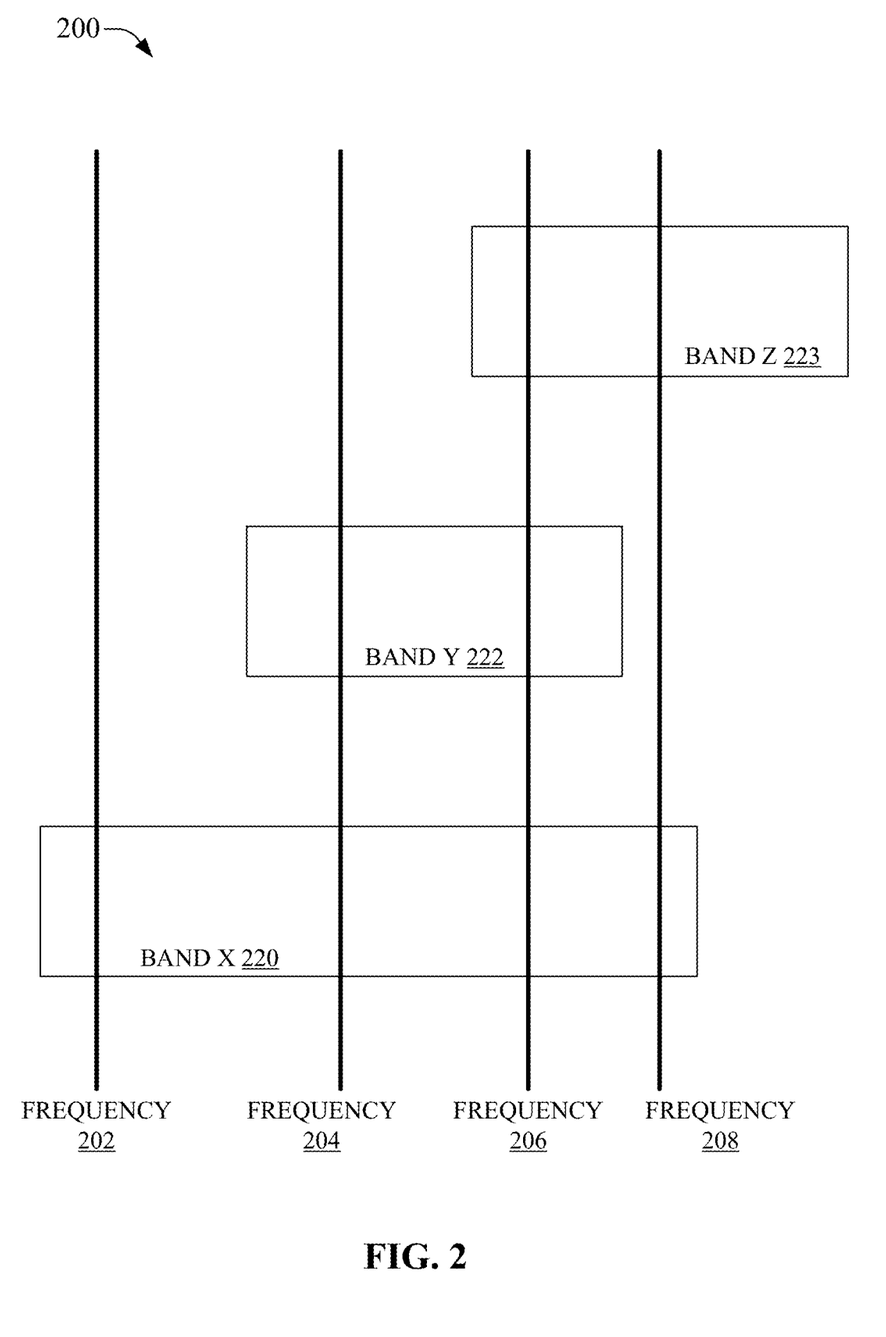
FIG. 2 is an illustration of at least partially overlapping frequency bands in accordance with aspects of the subject disclosure.

FIG. 2 is an illustration of at least partially overlapping frequency bands 200 in accordance with aspects of the subject disclosure. The bands 200 can comprise band X 220, band Y 222, and band Z 223. As can be observed, frequency 202 is present only in band X 220 and is not shared with band Y 222 or band Z 223. As can also be observed, both frequency 204 and 206 are shared between band X 220 and band Y 222, however, frequency 206 is also shared with band Z 223. Similarly, frequency 208 is common to both band X 220 and Band Z 223, but is not present in band Y 222. It can be noted that band Y 222 can comprise a frequency set also entirely represented in band X 220. Of further note, band A 223 and band X 220 have partially overlapping frequencies, but each band also comprises frequencies not present in the other band. A similar observation can be made between band Y 222 and band Z 223.

Where a UE, e.g., UE 110, etc., supports band X 220, the UE can be able to use any of frequency 202, 204, 206, 208, etc. Moreover, the UE can be able to use frequency 204 and 206 in band Y 222 and frequency 208 in band Z 223 because the device supports these physical frequencies where they are present in band X 220. However, where the UE is not made aware of the presence of channels associated with frequency 204 or 206 in band Y 222, or associated with frequency 208 in band Z 223, the UE can fail to employ those channels in the alternate bands, e.g., Y and Z, even where they can perform better than the corresponding channel in band X 220. As such, it can be desirable to notify the UE of channels available in alternate bands, e.g., via MFBI techniques and, accordingly, many newly developed UEs do incorporate the ability to support/read MFBI IEs via SIB messages. However, many UEs are still deployed that do not have MFBI via SIB message capability, e.g., UEs that use lower cost/older chipsets, legacy devices, etc. The presently disclosed subject matter allows a wireless carrier to provide access to channels in alternate bands by sending alternate channel data in a RRC connection release message comprising channel data, e.g., 130, etc.

Figure 3:
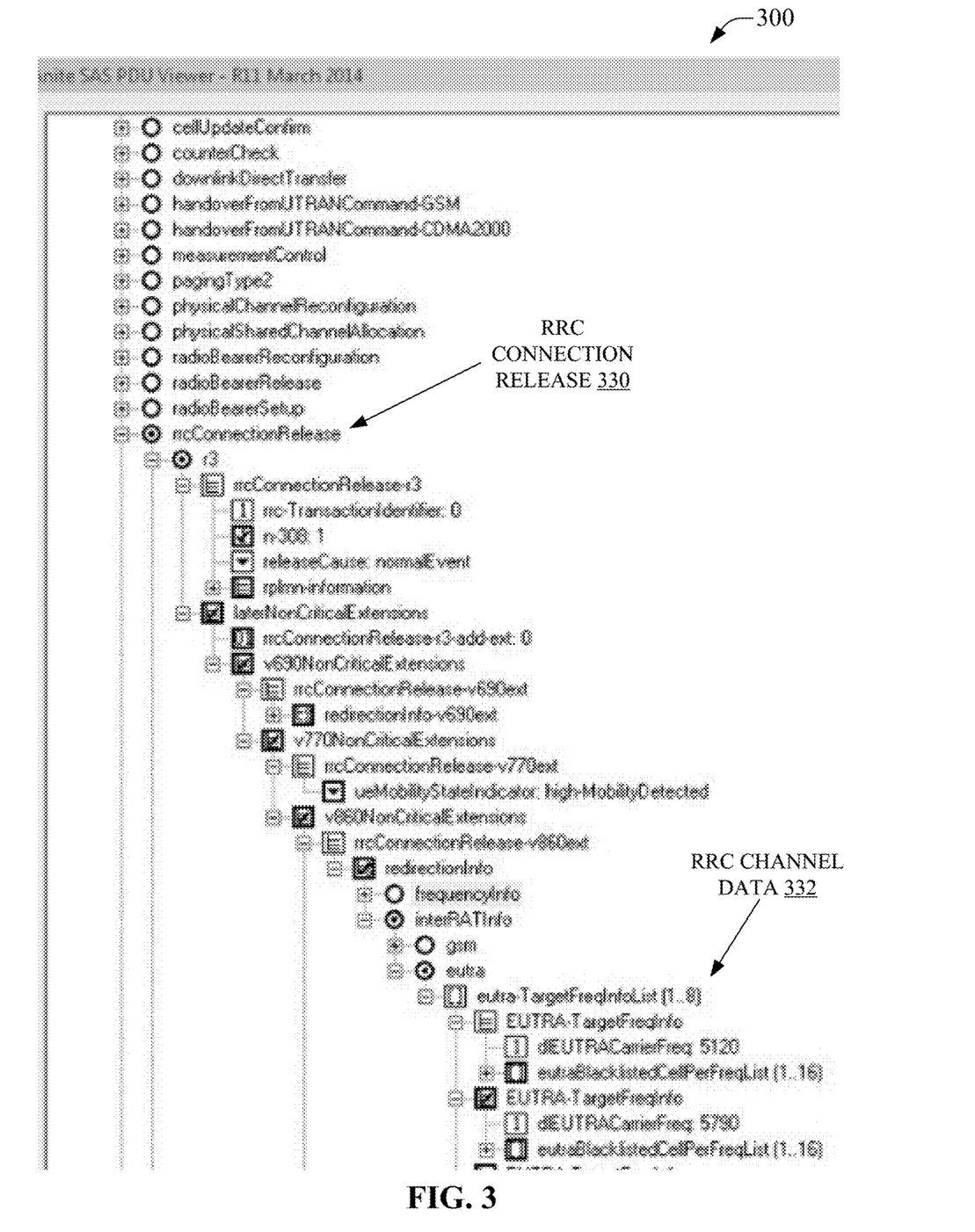
FIG. 3 illustrates an example radio resource control Connection Release comprising E-UTRA channel data in accordance with aspects of the subject disclosure.

FIG. 3 illustrates an example RRC Connection Release 300 comprising E-UTRA channel data in accordance with aspects of the subject disclosure. RRC Connection Release 300 can comprise parameters associated with RRC connection relaters 330. These parameters can comprise, for example, laterNonCritical Extensions, which can comprise redirectInfo, which can comprise eutra-TargetFreqInfoList (1 ... 8), as indicated by RRC channel data 332. RRC channel data 332, for example, can comprise channel number 5120, via dEUTRACarrierFreq 5120, which corresponds to band 12 with a downlink (DL) located at 740.0 MHz, an uplink (UL) located at 710.0 MHz, and a 17 MHz bandwidth. RRC channel data 332, for example, can further comprise channel number 5790, via dEUTRACarrierFreq 5790, which corresponds to band 17 with a downlink located at 740.0 MHz, an uplink located at 710.0 MHz, and a 12 MHz bandwidth. It can be observed that both 5120 and 5790 share the same physical frequency for the DL and UL but are located in different bands that have these frequencies in common. The RRC connection release 330 can therefore provide at least one alternate band channel number and, in the illustrated example, can comprise up to eight dEUTRACarrierFreq as part of RRC connection release 330, although the present disclosure is not so limited and can employ any number of dEUTRACarrierFreq or analogous values as part of RRC connection release 330.

In view of the example system(s) described above, example method(s) that can be implemented in accordance with the disclosed subject matter can be better appreciated with reference to flowcharts in FIG. 4-FIG. 7. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 4:
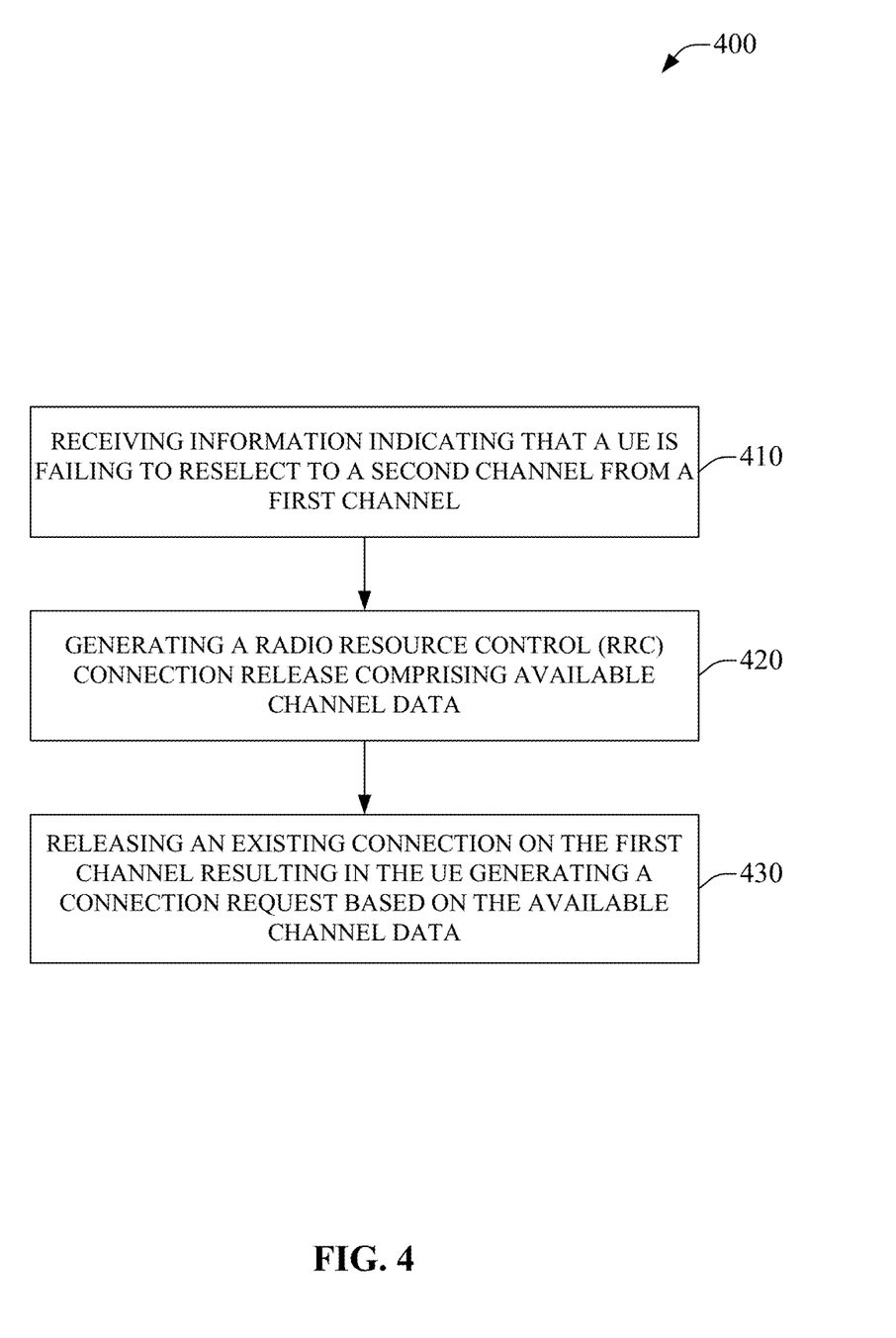
FIG. 4 illustrates an example method enabling channel selection for LTE in a MFBI environment via an radio resource control message, in accordance with aspects of the subject disclosure.

FIG. 4 illustrates a method 400 that enables channel selection for LTE in a MFBI environment via an RRC message, in accordance with aspects of the subject disclosure. Method 400, at 410, can comprise receiving information indicating that a UE is failing to reselect to a second channel from a first channel. The information, in an embodiment, can be related to an expiration of an inactivity timer on a Node B. As an example, a UE can stay on a UMTS cell after a circuit switched (CS) fall back (CSFB), resulting in the UE not camping back on to an LTE cell, which can result in an inactivity timer expiring. Information regarding this failure to camp back onto the LTE cell after the CSFB can cause information that can indicate that the UE has failed to reselect to a second channel, e.g., the LTE cell, etc., from a first channel, e.g., the UMTS cell. As another example, where a UE fails to switch to an LTE channel that is determined to have better metrics than a first LTE channel, this can cause information that can indicate that the UE has failed to reselect to a second channel, e.g., the better performing LTE channel, etc., from a first channel, e.g., the poorer performing LTE channel. Information that can indicate that the UE has failed to reselect to a second channel from a first channel can be based on various measurement and analysis techniques that are beyond the scope of the instant disclosure but will be appreciated by one of skill in the relevant art and, as such, will not be further discussed herein, although such lack of discussion is not intended to limit the scope of the instant disclosure but is done for the sake of clarity and brevity only. All permutations of generating information that can be received at 410 are to be considered within the scope of the present disclosure even where not explicitly recited herein.

At 420, a RRC connection release message can be generated. The RRC connection release message can comprise available channel data. In an aspect, the available channel data can comprise a channel number, a channel frequency, channel parameters such as bandwidth, type, etc., or nearly any other information related to designating an alternative channel that can be available to the UE. In an aspect, the RRC connection release message can comprise, for example, dEUTRACarrierFreq, as illustrated in FIG. 3, etc.

At 430, method 400 can comprise, releasing an existing connection to the first channel. This can result in the UE generating a connection request to establish a new connection to a RAN device. The connection request can be based on the available channel data from 420. At this point, method 400 can end. In an embodiment, the connection request can be a RRC connection request message comprising a determined channel in an alternative band, e.g., as can be indicated via dEUTRACarrierFreq from FIG. 3, etc.

As an example, where both LTE band 17 and LTE band 12 share certain frequencies, a UE 110 should be able to use a channel of band 12 or a channel of band 17 where the physical frequency is the same in both LTE band 12 and LTE band 17. However, because a UE can be unable to interpret MFBI IEs for a channel in an alternate band, the UE can be deprived of an opportunity to employ the channel in the alternate band without the presently disclosed subject matter. This can result in information indicating that the UE is failing to reselect to a second channel. As such, an RRC connection release message, e.g., at 420, comprising channel data can at least provide a channel number for an alternate band to the UE. The UE can then release an existing channel and start a new connection to the alternative channel. In an embodiment, the use of RRC connection release comprising available channel data can enable access to an alternate band channel without need to alter the hardware of a UE that cannot employ alternate channel data via a SIB message.

Figure 5:
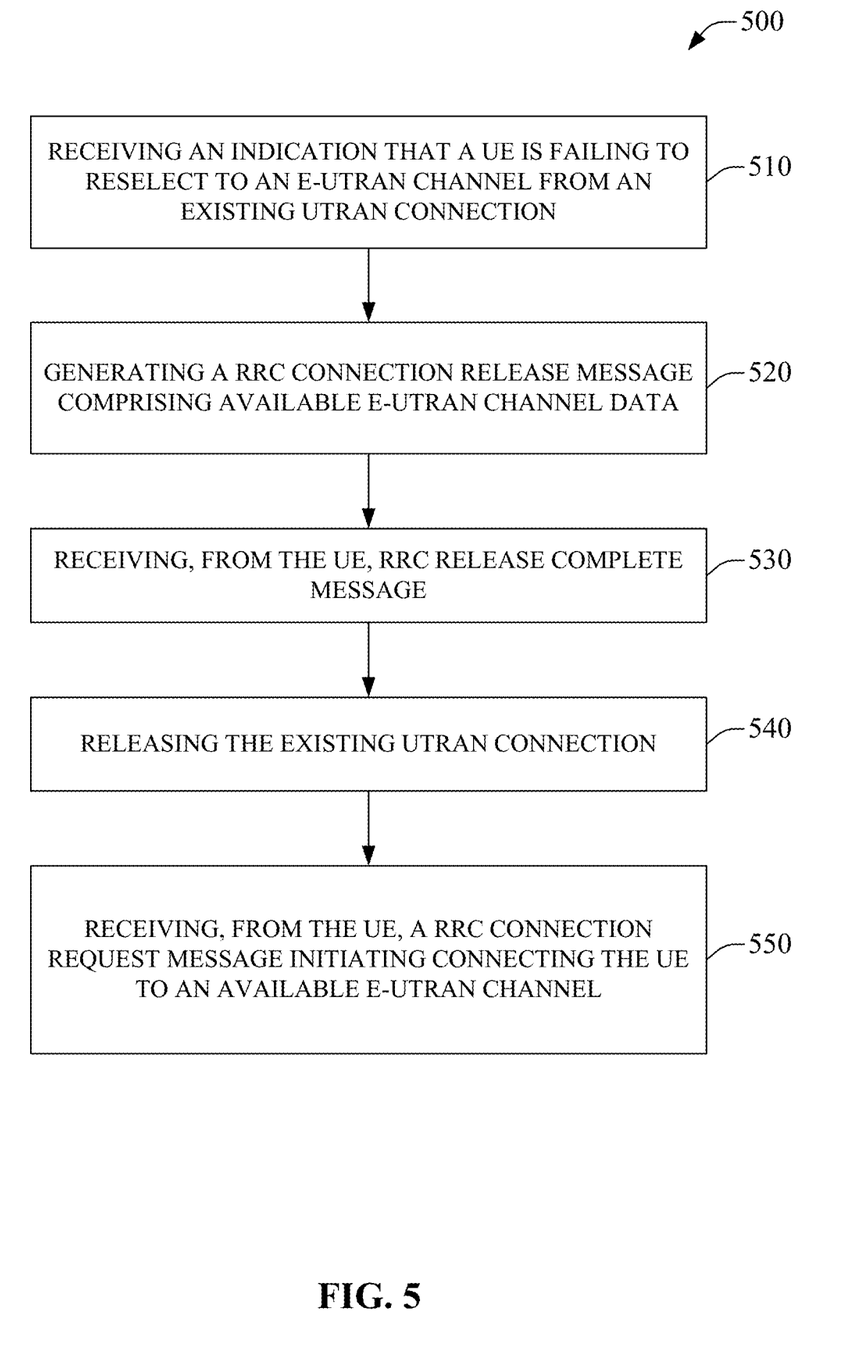
FIG. 5 illustrates an example method facilitating channel reselection for LTE in a MFBI environment via an radio resource control message, in accordance with aspects of the subject disclosure.

FIG. 5 illustrates a method 500 that facilitates channel reselection for LTE in a MFBI environment via an RRC message, in accordance with aspects of the subject disclosure. Method 500, at 510, can comprise receiving an indication that a UE is failing to reselect to a E-UTRAN channel from an existing UTRAN connection, e.g., an expiration of an inactivity timer on a Node B. As an example, a UE can stay on a UMTS cell after a CSFB, resulting in the UE not camping back on to an E-UTRAN channel. An indication regarding this failure to camp back onto the E-UTRAN channel after the CSFB can cause information that can indicate that the UE has failed to reselect to the E-UTRAN channel, e.g., an LTE cell, etc., from the UTRAN connection, e.g., via a UMTS cell.

At 520, a RRC connection release message can be generated. The RRC connection release message can comprise E-UTRAN channel data. In an aspect, the RRC connection release message can comprise, for example, dEUTRACarrierFreq, as illustrated in FIG. 3, etc. At 530, an RRC release complete message can be received from the UE. This can be in response to the UE receiving the RRC connection release message generated at 520. At 540, the existing UTRAN connection can be released, e.g., at the RAN device. The release can be responsive to the UE indicating that the connection has been released by the UE at 530 and, as such, there is no reason to maintain the connection at the RAN device.

At 550, method 500 can comprise, receiving, from the UE a RRC connection request message. The RRC connection request message can initiate connecting the UE to an available E-UTRAN channel as indicated in the RRC connection release message generated at 520. The RRC connection request can establish a new connection to a E-UTRAN channel via a RAN device. At this point, method 500 can end. In an embodiment, the connection request can be a RRC connection request message comprising a determined channel in an alternative band, e.g., as can be indicated via dEUTRACarrierFreq from FIG. 3, etc.

Figure 6:
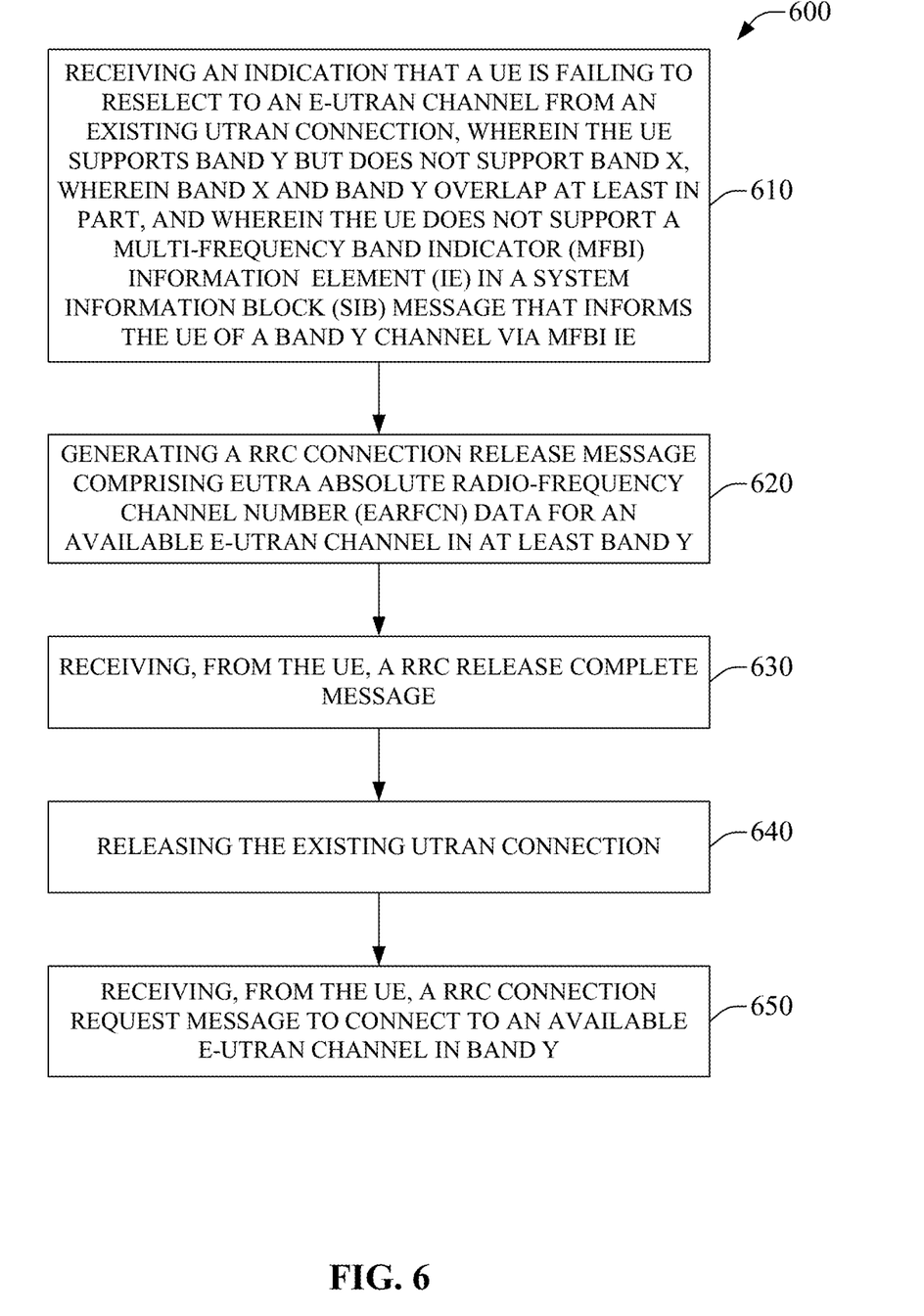
FIG. 6 illustrates an example method enabling channel selection for LTE band Y via an radio resource control message, in accordance with aspects of the subject disclosure.

FIG. 6 illustrates a method 600, which enables channel selection for LTE band Y via an RRC message, in accordance with aspects of the subject disclosure. Method 600 can comprise receiving an indication that a UE is failing to reselect to a E-UTRAN channel from an existing UTRAN connection. The UE can support band Y but not support band X and band Y and band X can at least partially overlap. The UE can also not support a MFBI IE in a SIB message, wherein the SIB can inform the UE of a band Y channel via the MFBI IE. Where a UE does not support MFBI IE via SIB, e.g., where the UE is a legacy device, a low cost device using a chipset with limited features, etc., the UE can be unable to interpret MFBI IEs communicated to the UE via SIB messaging. In these types of instances, the UE can correspondingly be ignorant of an alternative band channel.

At 620, a RRC connection release message can be generated. The RRC connection release message can comprise EARFCN data for an available E-UTRAN channel in at least band Y. In an aspect, the RRC connection release message can comprise, for example, dEUTRACarrierFreq, as illustrated in FIG. 3, etc., indicating a channel number in band Y. At 630, an RRC release complete message can be received from the UE. This can be in response to the UE receiving the RRC connection release message generated at 620. At 640, the existing UTRAN connection can be released, e.g., at the RAN device. The release can be responsive to the UE indicating that the connection has been released by the UE at 630 and, as such, there is no reason to maintain the connection at the RAN device.

At 650, method 600 can comprise, receiving, from the UE a RRC connection request message. The RRC connection request message can initiate connecting the UE to an available E-UTRAN channel in band Y, as indicated in the RRC connection release message generated at 620. The RRC connection request can establish a new connection to a E-UTRAN channel in band Y via a RAN device, e.g., RAN device 190, 192, etc. At this point, method 600 can end.

Figure 7:
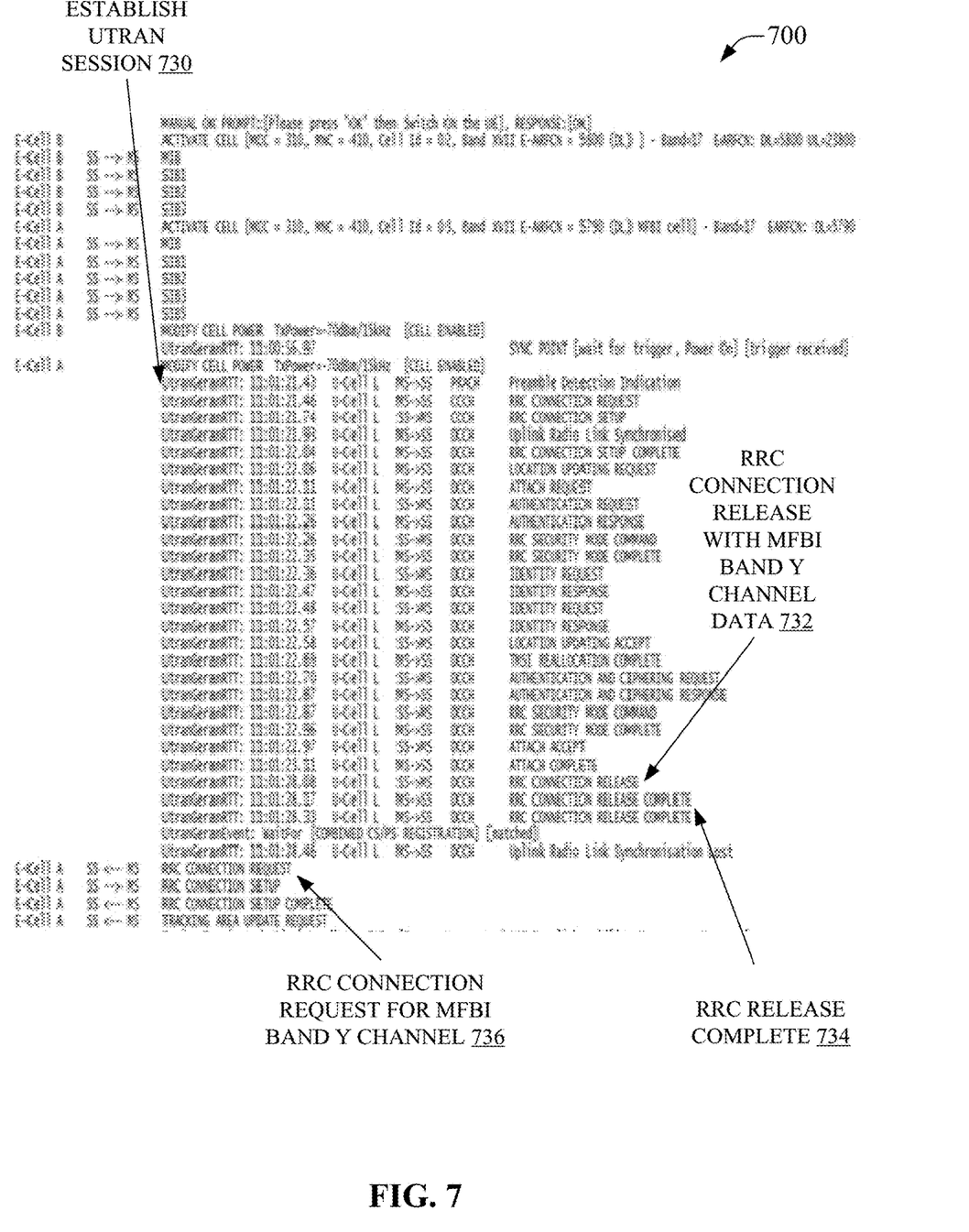
FIG. 7 illustrates an example radio resource control channel reselection command, radio resource control release, and radio resource control reconnection, in accordance with aspects of the subject disclosure.

FIG. 7 illustrates an example RRC channel reselection command process 700 comprising an RRC Connection Release, an RRC Release Complete, and an RRC Connection Request, in accordance with aspects of the subject disclosure. RRC channel reselection command process 700 can comprise commands establishing a UTRAN session 730. These commands can result in, for example, a CS session via a UTRAN element of a RAN.

RRC channel reselection command process 700 can further comprise, at 732, commands releasing, via RRC connection release message, the connection established at 730. The RRC connection release can comprise MFBI band Y channel data, e.g., EARFCN data. At 734, a RRC release complete message can be received, e.g., from the UE, indicating that the RRC connection release message at 732 was received by the UE and the connection has been released by the UE.

At 736, example RRC channel reselection command process 700 can comprise receiving, from the UE a RRC connection request to establish a new connection. This can be different from 730 in that the RRC connection request at 736 can specify MFBI band Y channel as designated in the RRC connection release message from 732. At this point, method 700 can end. As such, a UE that can fail to determine an alternative channel via a SIB message, via the RRC connection release message, can establish a connection at the alternative channel, e.g., on an alternative channel indicated in RRC connection release message sent at 732.

Figure 8:
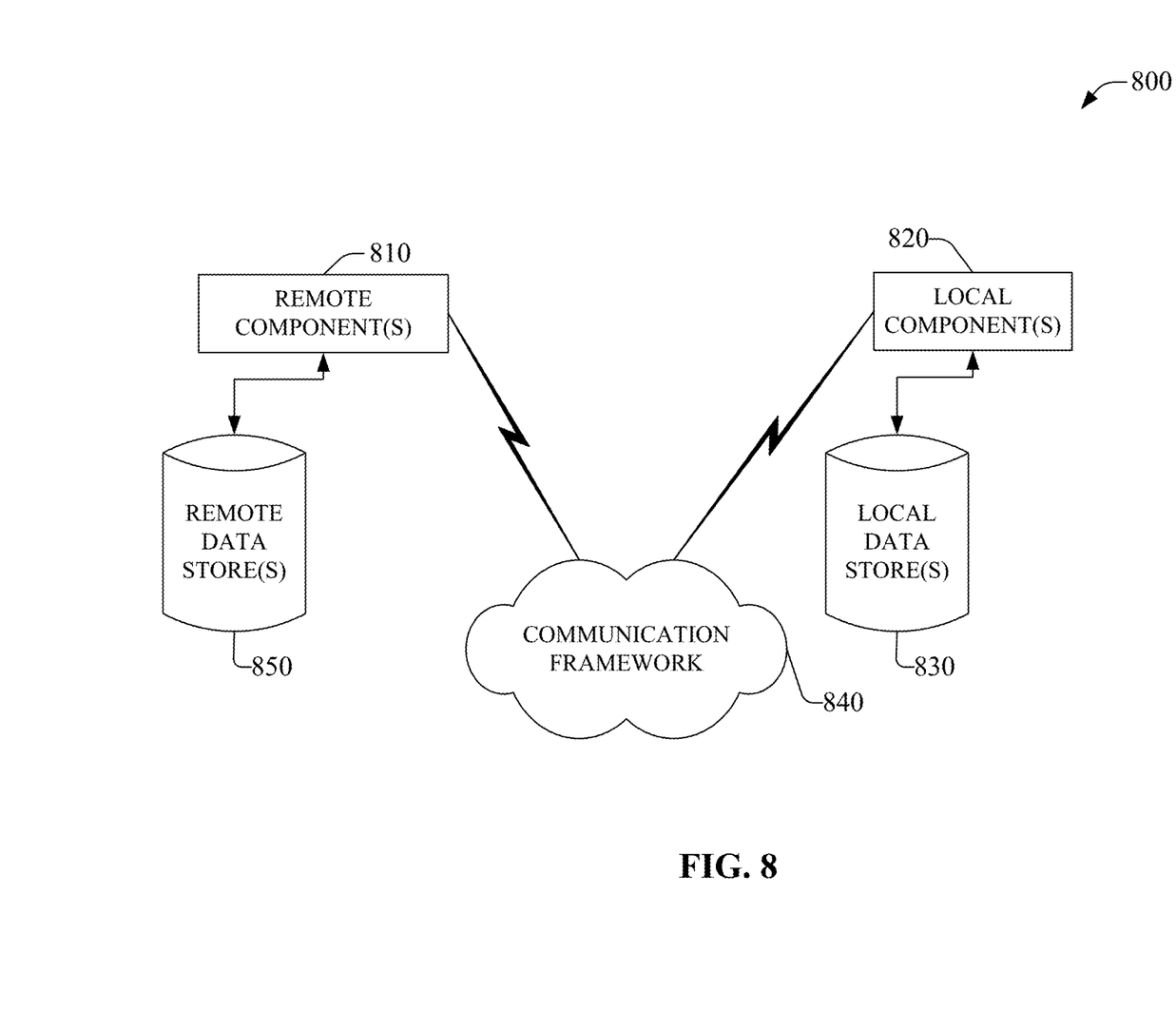
FIG. 8 depicts an example schematic block diagram of a computing environment with which the disclosed subject matter can interact.

FIG. 8 is a schematic block diagram of a computing environment 800 with which the disclosed subject matter can interact. The system 800 comprises one or more remote component(s) 810. The remote component(s) 810 can be hardware and/or software (e.g., threads, processes, computing devices). In some embodiments, remote component(s) 810 can comprise servers, personal servers, wireless telecommunication network devices, RAN device(s), etc. As an example, remote component(s) 810 can be RAN device 190, 192, etc.

The system 800 also comprises one or more local component(s) 820. The local component(s) 820 can be hardware and/or software (e.g., threads, processes, computing devices). In some embodiments, local component(s) 820 can comprise, for example, UE 110, etc.

One possible communication between a remote component(s) 810 and a local component(s) 820 can be in the form of a data packet adapted to be transmitted between two or more computer processes. Another possible communication between a remote component(s) 810 and a local component(s) 820 can be in the form of circuit-switched data adapted to be transmitted between two or more computer processes in radio time slots. The system 800 comprises a communication framework 840 that can be employed to facilitate communications between the remote component(s) 810 and the local component(s) 820, and can comprise an air interface, e.g., Uu interface of a UMTS network, via an LTE network, etc. Remote component(s) 810 can be operably connected to one or more remote data store(s) 850, such as a hard drive, solid state drive, SIM card, device memory, etc., that can be employed to store information on the remote component(s) 810 side of communication framework 840. Similarly, local component(s) 820 can be operably connected to one or more local data store(s) 830, that can be employed to store information on the local component(s) 820 side of communication framework 840. As examples, an indication of failure to reselect, e.g., 410, 510, 610, etc. can be stored on a data store(s) 850 of a remote component 810, an alternative band channel received via and RRC connection release message 130, 330, 332, 520, 620, 732, etc., can be stored on a local data store(S) 830 of a local component 820.

Figure 9:
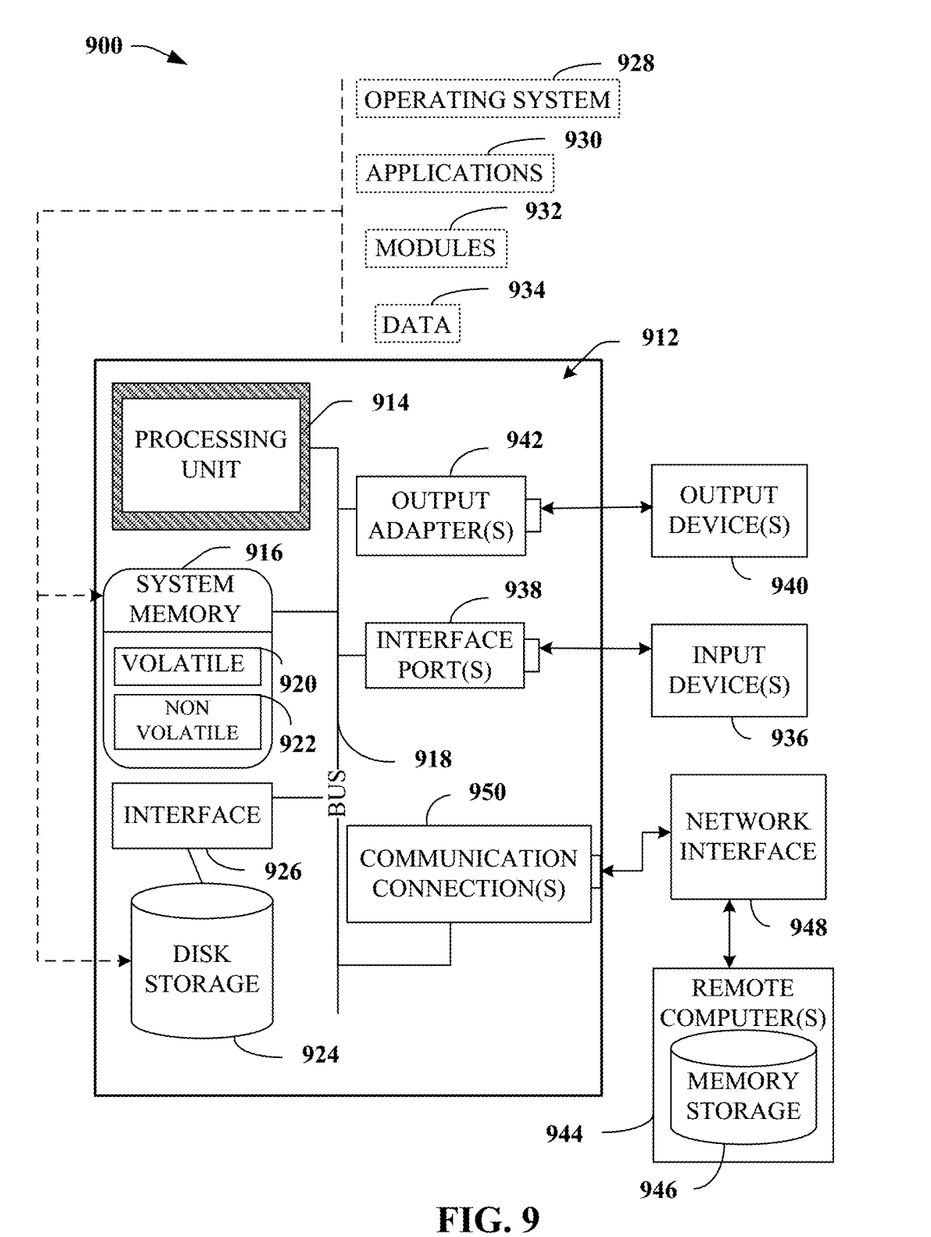
FIG. 9 illustrates an example block diagram of a computing system operable to execute the disclosed systems and methods in accordance with an embodiment.

In order to provide a context for the various aspects of the disclosed subject matter, FIG. 9, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 920 (see below), non-volatile memory 922 (see below), disk storage 924 (see below), and memory storage 946 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 9 illustrates a block diagram of a computing system 900 operable to execute the disclosed systems and methods in accordance with an embodiment. Computer 912, which can be, for example, RAN device 190, 192, etc., UE 110, etc., a NodeB, an eNodeB, a femtocell, a picocell, etc., comprises a processing unit 914, a system memory 916, and a system bus 918. System bus 918 couples system components comprising, but not limited to, system memory 916 to processing unit 914. Processing unit 914 can be any of various available processors. Dual microprocessors and other multiprocessor architectures also can be employed as processing unit 914.

System bus 918 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 916 can comprise volatile memory 920 and nonvolatile memory 922. A basic input/output system, containing routines to transfer information between elements within computer 912, such as during start-up, can be stored in nonvolatile memory 922. By way of illustration, and not limitation, nonvolatile memory 922 can comprise read only memory, programmable read only memory, electrically programmable read only memory, electrically erasable read only memory, or flash memory. Volatile memory 920 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 912 can also comprise removable/non-removable, volatile/non-volatile computer storage media. FIG. 9 illustrates, for example, disk storage 924. Disk storage 924 comprises, but is not limited to, devices like a magnetic disk drive, floppy disk drive, tape drive, flash memory card, or memory stick. In addition, disk storage 924 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 924 to system bus 918, a removable or non-removable interface is typically used, such as interface 926.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 9 describes software that acts as an intermediary between users and computer resources described in suitable operating environment 900. Such software comprises an operating system 928. Operating system 928, which can be stored on disk storage 924, acts to control and allocate resources of computer system 912. System applications 930 take advantage of the management of resources by operating system 928 through program modules 932 and program data 934 stored either in system memory 916 or on disk storage 924. It is to be noted that the disclosed subject matter can be implemented with various operating systems or combinations of operating systems.

A user can enter commands or information into computer 912 through input device(s) 936. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 912. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 914 through system bus 918 by way of interface port(s) 938. Interface port(s) 938 comprise, for example, a serial port, a parallel port, a game port, a universal serial bus, an infrared port, a Bluetooth port, an IP port, or a logical port associated with a wireless service, etc. Output device(s) 940 use some of the same type of ports as input device(s) 936.

Thus, for example, a universal serial busport can be used to provide input to computer 912 and to output information from computer 912 to an output device 940. Output adapter 942 is provided to illustrate that there are some output devices 940 like monitors, speakers, and printers, among other output devices 940, which use special adapters. Output adapters 942 comprise, by way of illustration and not limitation, video and sound cards that provide means of connection between output device 940 and system bus 918. It should be noted that other devices and/or systems of devices provide both input and output capabilities such as remote computer(s) 944.

Computer 912 can operate in a networked environment using logical connections to one or more remote computers, such as remote computer(s) 944. Remote computer(s) 944 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 912. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 946 is illustrated with remote computer(s) 944. Remote computer(s) 944 is logically connected to computer 912 through a network interface 948 and then physically connected by way of communication connection 950. Network interface 948 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 950 refer(s) to hardware/software employed to connect network interface 948 to bus 918. While communication connection 950 is shown for illustrative clarity inside computer 912, it can also be external to computer 912. The hardware/software for connection to network interface 948 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining that a base station device supports a first band of channels and a second band of channels, wherein the first band and the second band comprise an overlapping frequency, wherein the first band of channels comprises a first channel at a first physical frequency, wherein the second band of channels comprises a second channel at the first physical frequency, wherein the first band of channels and the second band of channels are long term evolution channel bands, and wherein the determining is based on a broadcast of information by the base station device identifying a channel of the second band and a multi-frequency band indicator channel of the first band via a system information block message; and
in response to determining that a mobile device has not switched, during a non-emergency condition and within a selected period, from the second channel of the second band to the first channel of the first band attributable to the mobile device being unable to read the multi-frequency band indicator channel of the first band of the system information block message, generating a radio resource control connection release message comprising an evolved universal terrestrial radio access channel number indication, wherein the radio resource control connection release message is communicated via the base station device to the mobile device, and wherein the radio resource control connection release message provides the mobile device with information to enable the mobile device to attach to the first channel of the first band based on the evolved universal terrestrial radio access channel number indication.

2. The system of claim 1, wherein the base station device broadcasts information identifying the second band and not identifying the first band.

3. The system of claim 2, wherein the first band is long-term evolution band 17, and wherein the second band is long term evolution band 12 multi-frequency band indicator.

4. The system of claim 2, wherein the first band is long-term evolution band 38, and wherein the second band is long term evolution band 41 multi-frequency band indicator.

5. The system of claim 1, wherein the base station device broadcasts information identifying a channel of the second band and a multi-frequency band indicator channel of the first band.

6. The system of claim 1, wherein the mobile device is unable to read the multi-frequency band indicator channel based on a chipset of the mobile device not supporting a corresponding multi-frequency band indicator command set.

7. The system of claim 1, wherein the operations further comprise:
establishing a new connection between the mobile device and the base station device employing the channel of the first band based on the evolved universal terrestrial radio access channel number indication.

8. A method, comprising:
receiving, by a system comprising a processor, a first indication that a base station supports a first band of channels and a second band of channels, wherein the first band and the second band comprise an overlapping frequency, wherein the first band and the second band are long term evolution band, wherein a channel of the second band is identified via a first system information block message from the base station, and wherein a multi-frequency band indicator channel of the first band is identified via a second system information block message from the base station;
receiving, by the system, a second indication that a mobile device has not transitioned from a first channel of the second band at the overlapping frequency to a second channel of the first band at the overlapping frequency within a selected time during a non-emergency condition, wherein the second indication is based on the mobile device being unable to read the multi-frequency band indicator channel of the first band; and
updating the mobile device, by the system via a radio resource control connection release message communicated by the base station to the mobile device, to enable the mobile device to attach to the second channel of the first band.

9. The method of claim 8, wherein the first band and the second band overlap from 704 MHz to 716 MHz.

10. The method of claim 8, wherein the first band and the second band overlap from 2570 MHz to 2620 MHz.

11. The method of claim 8, wherein the channel is a multi-frequency band indicator channel.

12. The method of claim 11, wherein the mobile device is unable to read the multi-frequency band indicator channel.

13. The method of claim 8, wherein the first system information block message and the second system information block message are a same system information block message.

14. The method of claim 8, wherein the first system information block message and the second system information block message are different system information block messages.

15. A user equipment, comprising:
a processor; and
a memory that stores executable instructions that, when executed by the processor, facilitate performance of operations, comprising:
receiving an indication that network equipment supports a first band of channels and a second band of channels, wherein the first band and the second band comprise at least one overlapping frequency, and wherein a channel of the second band and a multi-frequency band indicator channel of the first band are identified via a system information block message from the network equipment;
determining that the user equipment, in a non-emergency condition, has not updated an over-the-air connection to a first channel of the second band from a second channel of the first band according to a selection rule, wherein the mobile device is unable to read the multi-frequency band indicator channel of the first band; and
in response to receiving, via a radio resource control connection release message communicated from the network equipment to the user equipment, information to enable the user equipment to attach to the channel of the first band, updating the user equipment to enable the user equipment to attach to the second channel of the first band, wherein the second channel is at a physical frequency that is within both the first band and the second band, wherein the first band is a first long term evolution band, and wherein the second band is a second long term evolution band.

16. The user equipment of claim 15, wherein the first bands is long term evolution band 17 and the second band is long term evolution band 12, and wherein long term evolution band 17 overlaps long term evolution band 12 from 704 MHz to 716 MHz.

17. The user equipment of claim 15, wherein the first band is long term evolution band 38 and the second band is long term evolution band 41, and wherein long term evolution band 38 overlaps long term evolution band 41 from 2570 MHz to 2620 MHz.

18. The user equipment of claim 15, wherein the channel is a multi-frequency band indicator channel.

19. The user equipment of claim 18, wherein the user equipment is unable to read the multi-frequency band indicator channel based on a chipset of the user equipment being determined not to support a corresponding multi-frequency band indicator command set.

20. The user equipment of claim 15, wherein the indication comprises a multi-frequency band channel indicator.

* * * * *